(12) United States Patent
Vandevelde

(10) Patent No.: US 7,087,108 B2
(45) Date of Patent: Aug. 8, 2006

(54) HIGH DRY SUBSTANCE STEIN HALL ADHESIVES AND METHOD FOR PREPARING HIGH DRY SUBSTANCE STEIN HALL ADHESIVES

(75) Inventor: Daniël Vandevelde, Aalst (BE)

(73) Assignee: Tate & Lyle Europe, Aalst (BE)

( * ) Notice: Subject to any disclaimer, the term of this patent is extended or adjusted under 35 U.S.C. 154(b) by 0 days.

(21) Appl. No.: 10/503,068

(22) PCT Filed: Jan. 30, 2002

(86) PCT No.: PCT/EP02/00975

§ 371 (c)(1),
(2), (4) Date: Jul. 30, 2004

(87) PCT Pub. No.: WO03/064553

PCT Pub. Date: Aug. 7, 2003

(65) Prior Publication Data

US 2005/0072333 A1    Apr. 7, 2005

(51) Int. Cl.
*C09J 103/02*    (2006.01)
(52) U.S. Cl. .................................. 106/211.1
(58) Field of Classification Search ............ 106/211.1
See application file for complete search history.

(56) References Cited

U.S. PATENT DOCUMENTS

| | | | |
|---|---|---|---|
| 2,102,937 A * | 12/1937 | Bauer | 106/206.1 |
| 5,000,788 A * | 3/1991 | Stotler | 106/211.1 |
| 6,048,391 A | 4/2000 | de Valk et al. | |
| 2004/0102546 A1* | 5/2004 | Skuratowicz et al. | 524/47 |

FOREIGN PATENT DOCUMENTS

GB    1 571 336    7/1980

OTHER PUBLICATIONS

Chemical Abstracts vol. 76, No. 14: Columbus, Ohio: (Apr. 3, 1972) *Wheat Starch Adhesive*; Abst.

* cited by examiner

*Primary Examiner*—David M. Brunsman
(74) *Attorney, Agent, or Firm*—James Creighton Wray

(57) ABSTRACT

The invention relates to a method for preparing a high dry substance Stein Hall adhesive, comprising the steps of preparing a carrier portion by gelatinising at least a part of the total starch in the adhesive in an alkaline medium, diluting the carrier portion with a volume of water, and adding the remaining secundary starch in which a first step said carrier portion is prepared, in a second step the carrier portion is diluted with a volume of water, followed by the addition of at least a portion of the secundary starch, and in a third step the remaining alkali is added in a diluted form together with the secundary starch. The addition of the remaining secundary starch and alkali is preferably performed stepwise.

10 Claims, No Drawings

HIGH DRY SUBSTANCE STEIN HALL ADHESIVES AND METHOD FOR PREPARING HIGH DRY SUBSTANCE STEIN HALL ADHESIVES

This application claims the benefit of PCT Application No. PCT/EP02/00975 filed Jan. 30, 2002.

BACKGROUND OF THE INVENTION

The invention relates to a method for preparing a Stein Hall adhesive, comprising the steps:
preparing a carrier portion by gelatinising at least a part of the total starch in the adhesive in an alkaline medium;
diluting the carrier portion with a volume of water. and adding the remaining secundary starch, wherein in a first step said carrier portion is prepared using part of the alkali, and in a second step the carrier portion is diluted with a volume of water, followed by the addition of at least a portion of the secondary starch.

The invention further relates to a high dry substance Stein Hall adhesive (also called a high concentration Stein Hall adhesive or glue) obtained by a such method.

Starch based adhesives are well known in the corrugated board industry. Among the adhesives used, Stein Hall-type adhesives are the most popular.

Stein Hall adhesives are generally known as comprising a carrier portion of the adhesive that is obtained by gelatinising about 10–20% of the total starch in the glue using caustic soda. The resultant paste is then cooled and diluted with water and the remaining starch is then added as native granular starch. Also borax (1,5–2,5%) is added.

Under these circumstances, the maximum total starch concentration in these Stein Hall-type formulations does not surpass 25%, although values up to 30–37% on dry weight basis have been reported. These higher values were obtained when viscosity of the carrier was reduced by means of an oxidation reaction or the like.

The disadvantage of these low-concentration adhesives is that they contain higher water contents, reduce adhesion speed and retard drying of the adhesive layer in the adhesion step. In addition higher dry substance adhesives result in reduced energy consumption because smaller quantities of water need to be evaporated.

Subsequently, higher starch concentrations in the glue are desirable. But, it is also known that, when starch is used as the binding agent, there is a limit to the highest amount of starch that can be used. At higher amounts of starch the amount of water becomes insufficient to guarantee the desired adhesion, while the viscosity of the adhesive becomes too high.

High concentration starch based adhesives have already been described in the prior art. In EP 0 038 627 a starch based adhesive is described that is composed of a completely gelatinised starch fraction and a partly swollen starch fraction, this in a ratio between 0,2:100 and 2:1. The adhesive may contain between 10% and 40% dry weight starch solids. The gelatinised fraction is obtained by heat treatment at 95° C. or higher, and not via mixing with concentrated alkali as in a classic Stein Hall formulation. In fact, it is a no-carrier type adhesive to which a gelatinised starch fraction is added to improve wet tack of the adhesive.

In EP 0 576 221 adhesive compositions are disclosed comprising from 15 to 35% by weight starch solids. A substantial quantity of the starch is partially swollen (preferably between 20 and 50%).

EP 0 376 301 describes an adhesive prepared by treating a starch slurry in a jet cooker at a temperature between 120 and 200° C. to obtain a gelatinised dispersion. The ungelatinised is then added to this gelatinised dispersion. The total starch solids content in this formula, as illustrated in the examples, varied between 32 and 40%.

Also in GB 1 571 336, a method is described for the preparation of a starch-based aqueous adhesive. In this method, a carrier portion is prepared of gelatinised molecularly dispersed starch at a solids content from 3% to 40% by weight by cooing a starch slurry using a jet cooker. The carrier portion is ten mixed with a slurry of ungelatinize starch. Alkali is provided in the resulting mixture.

The adhesives described in these applications are not typical Stein Hall compositions.

In EP 1 101 809, high dry substance starch-based adhesives are described containing at least 40%, primarily at least 46% dry substance. This high dry substance content is realised by the addition of inorganic salts, preferably calcium carbonate, to the starch-based adhesive. The starch/filler ratio is preferably at least 60:40. The adhesive can be of the Stein-Hall, nosier or Minocar-type.

In EP 0 409 240, a high concentration starch slurry adhesive is described comprising between 20 and 60% by weight of starch solids. This adhesive is stabilised through the addition of a gum such as xanthan or rhamsan gum and some sodium hydroxide.

In WO 9850478 high dry substance adhesive compositions are that contain a substantive amount of water-soluble alkaline silicate, together with starch, borax and sodium hydroxide. Adhesive compositions containing up to 45% solids are disclosed in the examples.

Part of the above-cited prior-art documents are not related to Stein-Hall type adhesives, such as EP 0 038 627, EP 0 576 221, EP 0 376 301 and EP 0 409 240.

The two other documents cited, i.e. EP 1 101 809 and WO 9850478, may comprise Stein Hall-type adhesives, but they differ substantially from standard formulations in that they contain inorganic filler material that contributes to the high dry substance of the glue.

In the state of the art, further high dry substance Stein Hall-type adhesives have been disclosed.

In U.S. Pat. No. 3,912,531 high dry substance adhesives of the Stein Hall-type are disclosed containing up to 40% by weight of starch solids.

However, the disadvantage of this kind of high dry substance Stein Hall adhesives is that this is realised by using a fluidity starch having a fluidity between 25 and 90 as the carrier starch or as part of the carrier starch.

Also EP 0 049 009 discloses high dry substance glues of the Stein Hall-type. The problem underlying this patent document is how to obtain a final high DS glue where the viscosity does not increase strongly and whereby the mixture remains pumpable. In fact the glue must show some storage stability and workable viscosity.

In the patent document, it is stated that high dry substance glues can not be obtained with the conventional technology for preparing Stein Hall-type adhesives (which have a low dry substance). As described above, the method by which these kinds of Stein Hall-type glues are prepared comprises preparing the carrier and thereafter diluting it by lowering the alkalinity. When the alkalinity would not be lowered, the addition of the secundary starch would be affected and would result in granule swelling and viscosity instability.

However, if high dry substance clues have to be obtained, dilution is becoming insufficient to prevent undesirable swelling. In addition to this, the combination of less diluted carrier and high secundary starch concentration will result in composition that are no longer workable.

The solution to this problem that is proposed in the application EP 0 049 009 consists in oxidising the Wrier portion and then gelatinising the oxidised starch in presence of the necessary amount of sodium hydroxide, thereby reducing the viscosity of the carrier to a value which makes it possible to add the required secundary starch. This secundary starch is then added to reach a 40% d.s. glue. It should be emphasised that the carrier starch portion in the glue represents more than 14% of the starch dry substance present in the glue.

The disadvantage of this method is that high dry substance glues are obtained with the necessity of using reduced viscosity starches in the carrier fraction.

The reduced viscosity starches referred to in the patent documents of the state of the art typically are fluidity starches or oxidised starches in which the fluidity starches are obtained via chemical or enzymatic degradation.

In U.S. Pat. No. 6,048,391, a process is described for the preparation of a starch based glue for making corrugated board. The process is carried out in a system which includes a first and relatively large mixing vessel containing a stirrer. A second and smaller mixing vessel is connected to the first mixing vessel via a recirculation path. The second and smaller mixing vessel contains means for exerting a shearing force which is greater than the shearing force exerted in the first and larger mixing vessel. The process is carried out in two steps. In a first step, water and starch are supplied to form a carrier in the first mixing vessel and then the resulting carrier is transported to the second mixing vessel. Lye is first added in a controlled manner in the second mixing vessel to prepare the carrier. A second step adds farther amount of starch, water, borax, and a second shot of lye to the carrier while in the small vessel.

The disadvantage of this system is that a supplementary mixing vessel is provided, wherein a circulation loop is introduced. In this way, a technical more complex and more expensive system is provided. Furthermore, the Stein Hall adhesives as obtained by this method do not have a high dry substance.

SUMMARY OF THE INVENTION

The purpose of the invention is to provide a method for preparing a Stein Hall adhesive which doesn't show the abovementioned disadvantages.

This purpose is achieved by providing a method for preparing a Stein Hall adhesive, comprising the steps:

preparing a carrier portion by gelatinising at least a part of the total starch in the adhesive in an alkaline medium;

diluting the carrier portion with a volume of water; and adding the remaining secondary starch;

wherein in a first step said carrier portion is prepared using part of the alkali, and in a second step the carrier portion is diluted with a volume of water, followed by the addition of at least a portion of the secondary starch, wherein a high dry substance Stein Hall adhesive is prepared using a single mixing vessel, wherein in the first step said carrier portion is prepared in the single mixing vessel, and in a third step the remaining alkali is added in a diluted form together with the secondary starch.

DETAILED DESCRIPTION OF THE PREFERRED EMBODIMENTS

In a preferred method according to the invention, the addition of the remaining secondary starch and alkali is performed stepwise.

This has the advantage that the secundary starch is not directly submitted to excessively high alkaline concentrations, thus preventing premature swelling of the secondary starch.

In a more preferred method according to the invention, the addition of alkali and starch is done in at least two steps.

In a specific method according to the invention, during the first step, a carrier portion is prepared containing between 2 and 9% of the total starch content by mixing the starch together with water and alkali until all the starch has gelatinised.

In a more specific method according the invention, in the first step, the alkali content in the carrier portion is typically less than ⅔ of the total amount needed in the adhesive formulation.

In another specific method according the invention, in the second step the carrier portion is diluted with a volume of water corresponding to 60 to 85% of the carrier volume.

In a more specific method according the invention, in the second step 50 to 75% of the secundary starch is added.

In a preferred method according to the invention, after the third step borax is added.

The advantage of this is that initial tacking is improved and both water retention and penetration ability of the adhesive is regulated.

The purpose of the invention is further achieved by providing a high dry substance Stein Hall adhesive obtained by a method as described above, whereby it contains between 32 to 45% native or stabilised starch;

the ratio carrier starch to secondary starch is between 1:50 and 1:11;

it shows a Bauer-viscosity between 21 s and 60 s; and the alkali concentration in the glue is sufficient to provide a SGP of between 45° C. and 53° C.

In a preferred high dry substance Stein Hall adhesive according the invention, the native or stabilised starch is obtained from cereal, tuber or root starches.

The method for preparing the glues of the invention comprises several consecutive steps:

during a first step a carrier portion is prepared containing between 2 to 9% of the total starch content, by mixing the starch together with water and alkali until all the starch has gelatinised. The alkali content in the carrier portion is typically less than ⅔ of the total amount needed in the glue formulation;

during the next step the carrier portion is diluted with a volume of water corresponding to 60 to 85% of the carrier volume, followed by the addition of at least half, and at most 75% of the secundary starch.

in a further step the remaining alkali is then added in a diluted form together with the remaining secundary starch.

The addition of remaining starch and alkali can be performed simultaneously or stepwise. When addition is performed simultaneously, care must be taken that starch is not submitted directly to alkali.

During the stepwise addition, alkali is first added to the mixture of the first and the next step, followed by the addition of the remaining secundary starch. Stepwise addition of alkali and starch is preferably done in two or more steps.

Finally borax is added to finish the glue.

The high dry substance Stein Hall type adhesives according to the invention have the following properties:
- they contain between 32 to 45% native or stabilised starch,
- the ratio carrier starch to secundary starch is between 1:50 to 1:11,
- they show a Bauer-viscosity between 21 s and 60 s,
- and the alkali concentration in the glue is sufficient to provide a SGP of between 45 and 53° C.

The native or stabilised starch can be obtained from cereal, tuber or root starches. Typical examples thereof are e.g. starches obtained from maize, wheat, barley, potato, tapioca or arrowroot, including the waxy and high amylose type starches. The stabilised starches referred to in the application correspond with starches that have been physically and/or chemically treated in view of obtaining starches that are less sensitive to alkali at ambient or slightly higher temperatures. As a result thereof they are not subject to uncontrolled premature swelling and/or gelatinisation.

The advantage of the high dry substance Stein Hall adhesives according to the invention and produced by the method by the invention is that there is no necessity to use reduce viscosity starches in the carrier fraction, while the corresponding adhesives still do show excellent storage stability, and workable viscosities. They only contain native or stabilised starches. Furthermore, a final pumpable high dry substance glue is obtained.

This invention will now be illustrated by the following examples which should be considered as being not limiting to the scope of the invention as such and as expressed in the following claims.

EXAMPLE 1

A high dry substance glue was prepared as follows:

In a 2000 l vessel, first the carrier fraction was prepared. Therefore, 16 l of a 30% w/w NaOH-solution was mixed into a dispersion containing 28 kg stabilised wheat starch and 650 l water. The mixture was stirred with a high shear mixer at 1500 rpm for 10 minutes, allowing the starch to gelatinise. The starch in the carrier fraction corresponds with 3,25% of the total starch content in the glue (1:30 ratio).

In a next step 550 l tap water was added to the carrier together with 500 kg stabilised wheat starch and 3 kg borax. The whole was mixed at 1500 rpm for an additional 5 minutes.

Before addition of the remaining alkali and starch, the remaining 12 l 30% w/w NaOH solution was first diluted with 100 l of water.

Then 37 l diluted alkali, followed by 200 kg of stabilised wheat starch was added into the vessel. This mixture was stirred for 5 minutes before a second quantity of 37 l of alkali and 138 kg of starch was added. Again the mixture was stirred intensively. Finally the remaining 38 l alkali and 6,5 kg borax was added while stirring the glue.

The thus prepared glue formulation comprises 40% by weight starch solids and is composed of:
Water: 1300 l
Starch: 866 kg
Volume: 1820 l
NaOH: 6,25 g/l
Borax: 5,21 g/l The thus prepared glue did show the following properties:

|  | Direct after preparation | After 30 minutes | After 6 hours |
| --- | --- | --- | --- |
| Bauer (seconds) | 22 | 25 | 27 |
| Brookfield (mPas, 20 rpm) | 480 | 500 | 710 |

SGP: 47° C.

EXAMPLE 2

In this example a glue is described containing 40% by weight maize starch solids. In a 1500 l recipient, 24 kg maize starch is dispersed in 440 l water. To this dispersion, 12 kg of 33% w/w NaOH was added and the mixture was stirred with a high shear mixer for 12 minutes at 1500 rpm. The starch in the carrier fraction corresponds with 4,2% of the total starch content in the glue (1:24 ratio).

In a next step 320 l water followed by 4,5 kg borax was added and intensively stirred for 3 minutes. Then 300 kg starch were added to the carrier fraction and homogeneously dispersed therein by mixing at 1500 rpm for an additional 3 minutes. Before addition of the remaining alkali and starch, this additional alkali fraction (10 kg 33% NaOH) was diluted with 100 l of water.

Thus 37 l diluted alkali, followed by 151 kg of stabilised maize starch was added to the recipient, and stirred at 1500 rpm for 3 minutes. Then a second quantity of alkali, followed by 100 kg of starch was added and dispersed. Finally the remaining 35 l alkali together with 4 kg of borax was added while stirring.

The thus prepared glue formulation comprises 40% by weight starch solids and is composed of:
Water: 860 l
Starch: 575 kg
Volume: 1200 l
NaOH: 6,25 g/l
Borax: 6,25 g/l The thus prepared glue did show the following properties:

|  | Direct after preparation |
| --- | --- |
| Bauer viscosity (seconds) | 48 |
| Brookfield (mPas, 20 rpm) | 1600 |

SGP: 48,5° C.

The invention claimed is:

1. Method for preparing a Stein Hall adhesive, comprising the steps of:
   preparing a carrier portion by gelatinising at least a part of the total starch in the adhesive in an alkaline medium;
   diluting the carrier portion with a volume of water; and
   adding the remaining secondary starch;
   wherein in a first step said carrier portion is prepared using part of the alkali, and in a second step the carrier portion is diluted with a volume of water, followed by the addition of at least a portion of the secondary starch,
   wherein a high dry substance Stein Hall adhesive, containing between 32 and 45% dry weight starch solids, is prepared using a single mixing vessel, wherein in the first step said carrier portion is prepared in the single mixing vessel, and in a third step the remaining alkali is added in a diluted form together with the secondary starch.

2. Method according to claim 1, wherein the addition of the remaining secondary starch and alkali is performed stepwise.

3. Method according to claim 2, wherein the addition of alkali and starch is done in at least two steps.

4. Method according to claim 1, wherein during the first step, a carrier portion is prepared containing between 2 and 9% of the total starch content by mixing the starch together with water and alkali until all the starch has gelatinised.

5. Method according to claim 1, wherein in the first step, the alkali content in the carrier portion is typically less than ⅔ of the total amount needed in the adhesive formulation.

6. Method according to claim 1, wherein in the second step the carrier portion is diluted with a volume of water corresponding to 60 to 85% of the carrier volume.

7. Method according to claim 1, wherein in the second step 50 to 75% of the secondary starch is added.

8. Method according to claim 1, wherein after the third step borax is added.

9. High dry substance Stein Hall adhesive, obtained by a method according to claim 1, wherein it contains
    between 32 to 45% native or stabilised starch;
    the ratio carrier starch to secondary starch is between 1:50 and 1:11;
    it shows a Bauer-viscosity between 21 s and 60 s; and
    the alkali concentration in the glue is sufficient to provide a starting gel point of between 45° C. and 53° C.

10. High dry substance Stein Hall adhesive according to claim 9, wherein the native or stabilised starch is obtained from cereal, tuber or root starches.

* * * * *